Oct. 7, 1930.  C. F. HOGELUND  1,777,435
FULL VISION FROST SHIELD
Filed Dec. 30, 1929
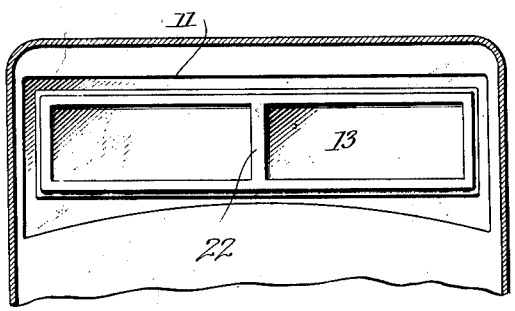
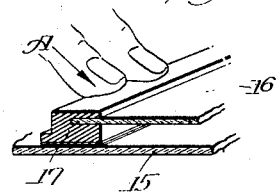
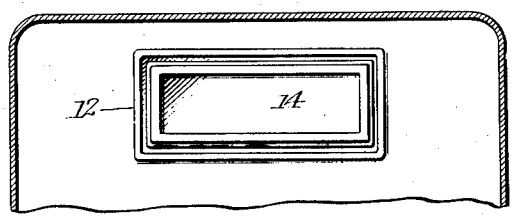
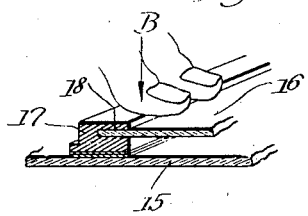
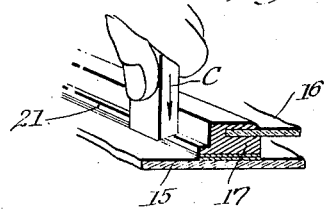
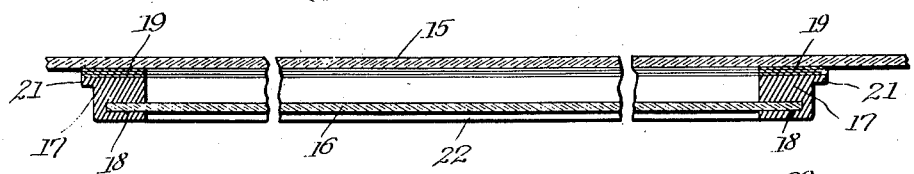
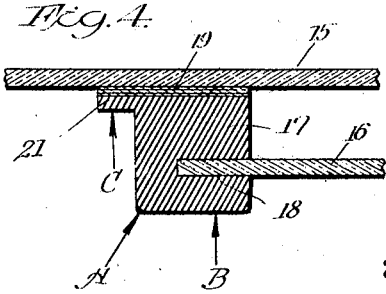
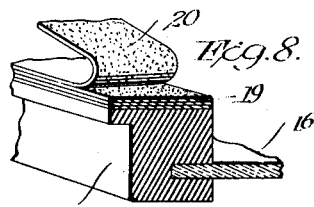
Inventor
Carl F. Hogelund.
By Emery, Booth, Varney & Holcombe
his Attorneys Patented Oct. 7, 1930

1,777,435

UNITED STATES PATENT OFFICE

CARL F. HOGELUND, OF MINNEAPOLIS, MINNESOTA, ASSIGNOR TO FLOUR CITY SPECIALTY MFG. CO., OF MINNEAPOLIS, MINNESOTA, A CORPORATION OF DELAWARE

FULL-VISION FROST SHIELD

Application filed December 30, 1929. Serial No. 417,527.

This application is in part a continuation of and substitute for my earlier application, Ser. No. 339,959, filed February 14, 1929, for improvements in clear vision devices for attachment to windows, windshields and the like.

The invention relates to means to maintain a clear vision through automobile windshields and vehicle and cab windows generally, subject to extremely low outside temperatures likely to cause deposition of moisture from the more humid air within, and aims to provide an improved transparent shield and mode of attaching the same directly to the glass pane for the purpose of preventing such deposition.

The invention comprises a self-adjusting frame for positioning the transparent shield adjacent to the surface to be protected, and adhesive means for securing said frame to said surface so as to prevent access of moisture thereto, and with a minimum obstruction to the view. A further object is to provide a "tell tale" or indicator for enabling the device to be properly secured in place and to give warning of any insecurity or looseness occurring at any time during use.

Other aims and advantages of the invention appear in connection with the following description of the illustrative device and mode of attachment shown in the accompanying drawings, wherein Fig. 1 is a view from the inside of an automobile, looking through the windshield, and showing the clear vision shield in position thereon;

Fig. 2 is a similar view showing a rear window with a clear vision attachment mounted on the inner side thereof;

Fig. 3 is a horizontal sectional view on the line 3—3 in Fig. 1, drawn to a larger scale;

Fig. 4 is an enlarged cross-section of a portion of the frame and adjacent glass pane and shield, showing the details of the attaching means;

Figs. 5, 6 and 7 are perspective views of a portion of the frame and shield, showing the preferred mode of attaching it in place on a glass pane; and Fig. 8 is a perspective view of a portion of the frame showing the preferred means for protecting it during shipment.

The invention is applicable to both stationary and movable windows and windshields for all purposes, but is described as applied to an ordinary passenger automobile of the closed type, having a windshield 11 and rear window 12 to which suitably proportioned clear vision shields 13, 14 are secured on the inner side of the respective panes 15.

In the embodiment of the invention illustrated in the drawings, a clear vision is maintained by a flat pane of glass 16 which is held in a flexible frame 17 adjacent to the portion of the window glass 15 to be kept clear of moisture and frost and at a sufficient distance therefrom to provide a heat insulating dead air space therebetween. The air within the car is enough warmer than the outside air to maintain the frost shield glass 16 at a sufficient temperature to prevent deposition of moisture thereupon under usual winter conditions of low humidity.

Care must be taken to prevent any moisture from seeping between the frost shield and the windshield glass or window pane, and to this end means are provided for hermetically sealing the joint between the frost shield pane and its frame, and the joint between the frame and the window or windshield. In the device illustrated the frame 17 is a continuous band of flexible rubber encircling the pane 16 and provided with a groove or recess 18 in its inner side for receiving the edge of the pane, the width of the groove and size of the frame being slightly less than the dimensions of the pane so that when the frame is stretched over the glass it will cling to it at all points of contact.

The frame 17 is preferably attached to the windshield or window glass 15 by means of a suitable adhesive having the property of softening at 80° or so Fahrenheit to permit of the removal of the device during the warm season. An adhesive similar to that used for applying surgeon's plaster has been found satisfactory, preferably colored black for a purpose to be described.

A convenient means of applying the adhesive and securing the frame in place is formed by coating both sides of a woven strip of fabric or tape with the adhesive so as to produce a double faced strip 19 of the width of the base of the frame, which may be applied to the frame at the place of manufacture and covered with a strip of Holland cloth or similar material 20 to protect the adhesive on its exposed face from dirt and prevent it from sticking to the wrapper in which the device is shipped. This protecting strip is shown in Fig. 8 of the drawings partly removed from the frame preparatory to applying the device to a window.

The device may be readily applied so as to maintain a tight and permanent seal between it and the windshield or window pane by the following mode of procedure: First, wash the inside faces of the glass in the shield and window, then remove the cloth protective strip 20 and clean the exposed adhesive surface of the attaching strip 19 by means of gasoline or other solvent and softening agent for gum and grease, and after making sure that the frost shield pane 16 is snugly embraced in the groove 18, lay the frame 17 and enclosed glass pane 16 in the exact position desired upon the windshield or window pane with the adhesive side of the frame next to the windshield or window glass, pressing it on by diagonally applied inward pressure all around the frame as illustrated in Fig. 5 and indicated at A in Fig. 4. This seats the pane firmly in the frame. Next press the inner edge of the frame tightly against the pane by pressure at right angles thereto as illustrated in Fig. 6 and indicated at B in Fig. 4, continuing all around the frame to seat it firmly on the windshield or window. Lastly, with a blunt instrument press the flange 21 tightly against the glass as illustrated in Fig. 7 and indicated at C in Fig. 4, following all the way around to form a continuous seal, the thin flexible flange readily accommodating itself to any inequalities in the glass.

By observing the appearance of the joint as seen through the windshield or window glass from the opposite side it can be ascertained whether or not the operation has been perfectly completed, any slight air gaps or breaks in the seal due to imperfect contact being evidenced by a grayish or silvery appearance as contrasted with the solid black color where the adhesion is complete.

Such inspection may be made periodically and any loosening immediately detected and remedied by pressure as above described.

Any contrasting color for the adhesive may be selected that will show up the thin air film formed between the frame and glass where the contact is incomplete, but black is preferred.

The rubber frame is sufficiently flexible to accommodate differences in expansion and contraction due to changes or differences in temperature between the windshield or window and the frost shield, thereby preventing loosening of the joint and spoiling the seal between the two members.

The device may be removed at the end of the winter season by warming the adhesive and prying it loose with a thin blade, and may be reapplied the following winter by renewing the adhesive tape. A middle cross band or tie 22 (see Fig. 1) may be provided for retaining the flexible rubber frame 17 of long frost shields in position on the glass pane 16 when the device is not in use.

The device is neat in appearance and occupies but little space in the car, interfering but slightly with the limits of the field of vision. It is easily installed and requires practically no attention to maintain it in effective working condition. In addition to preventing accumulation of moisture and frost on the window or windshield, it tends to diminish the glare of approaching lights and introduces no peculiar reflection or distortion if lights or other objects seen through or reflected from it.

The invention is not restricted to the preferred embodiment described, but what I claim and desire to secure by Letters Patent is as follows:

1. A clear vision device for attachment to glass windows and windshields comprising a transparent panel embraced in a flexible frame, said frame having a flat attaching face, and adhesive material on the attaching face of the frame for the purpose of attaching it directly to a glass window or windshield, said adhesive material being protected prior to use by a removable cover applied thereto and secured thereby, substantially as described.

2. A clear vision device for attachment to glass windows and windshields comprising a transparent panel embraced in a continuous flexible frame, said frame having a flat attaching face, and adhesive material of a dark color applied to the attaching face of said frame in an unbroken layer for the purpose of attaching it to a glass window or windshield and indicating whether or not such attachment is complete and effective.

3. A clear vision attachment for windows and windshields, comprising a frame, a band of flexible material, adhesive material on the opposite sides of said band, the band being secured between a window pane or windshield and the frame and adhering thereto to hold the frame in position thereon, and a panel of transparent material mounted in said frame spaced from the window pane or windshield.

4. A clear vision attachment for windows and windshields comprising a frame adapted to engage a surface of a window pane or windshield, said frame being widened at the zone of engagement thereof with the windshield, a layer of fabric, adhesive material on the two faces of said layer of fabric, the adhesive material on one face engaging the face of the frame, the adhesive material on the other face engaging the window pane or windshield, and a panel of transparent material mounted on said frame and spaced from the window pane or windshield.

5. A clear vision device for attachment to glass windows and windshields comprising a transparent panel mounted in a flexible frame having a continuous flat surface for engaging the surface of the supporting glass, adhesive means in strip form presenting a continuous attaching layer secured to said flat surface, said adhesive means being entirely covered by said frame when applied to the window or windshield.

6. A clear vision attachment for glass windows and windshields comprising a transparent panel embraced in a flexible frame having a continuous flange around its base for engaging flatwise against the glass of the window or windshield, and adhesive material on the engaging face of said flange, whereby said attachment may be secured to said glass and the joint between the frame and glass maintained tight under all conditions of temperature and humidity.

In testimony whereof, I have signed my name to this specification.

CARL F. HOGELUND.